(12) United States Patent
Motoyama

(10) Patent No.: US 7,506,048 B1
(45) Date of Patent: Mar. 17, 2009

(54) METHOD AND SYSTEM FOR MONITORING NETWORK CONNECTED DEVICES AND DISPLAYING DEVICE STATUS

(75) Inventor: Tetsuro Motoyama, Cupertino, CA (US)

(73) Assignee: Ricoh Co. Ltd., Tokyo (JP)

( * ) Notice: Subject to any disclaimer, the term of this patent is extended or adjusted under 35 U.S.C. 154(b) by 672 days.

(21) Appl. No.: 10/162,402

(22) Filed: Jun. 5, 2002

(51) Int. Cl.
*G06F 15/173* (2006.01)

(52) U.S. Cl. ...................... 709/224; 709/217
(58) Field of Classification Search .................. 709/224
See application file for complete search history.

(56) References Cited

U.S. PATENT DOCUMENTS

| | | | | |
|---|---|---|---|---|
| 5,475,805 | A * | 12/1995 | Murata | 715/513 |
| 5,537,554 | A * | 7/1996 | Motoyama | 710/100 |
| 5,544,289 | A * | 8/1996 | Motoyama | 710/100 |
| 5,568,618 | A * | 10/1996 | Motoyama | 710/100 |
| 5,649,120 | A * | 7/1997 | Motoyama | 710/100 |
| 5,745,909 | A | 4/1998 | Perlman et al. | |
| 5,774,678 | A * | 6/1998 | Motoyama | 710/100 |
| 5,960,214 | A * | 9/1999 | Sharpe et al. | 710/15 |
| 5,987,513 | A * | 11/1999 | Prithviraj et al. | 709/223 |
| 6,003,097 | A * | 12/1999 | Richman et al. | 710/8 |
| 6,061,715 | A * | 5/2000 | Hawes | 709/203 |
| 6,108,782 | A * | 8/2000 | Fletcher et al. | 713/153 |
| 6,122,639 | A * | 9/2000 | Babu et al. | 707/103 R |
| 6,173,296 | B1 | 1/2001 | Perlman et al. | |
| 6,233,618 | B1 * | 5/2001 | Shannon | 709/229 |
| 6,244,762 | B1 * | 6/2001 | Fukano et al. | 400/70 |
| 6,286,035 | B1 * | 9/2001 | Gillis et al. | 709/206 |
| 6,317,848 | B1 | 11/2001 | Sorens et al. | |
| 6,321,991 | B1 | 11/2001 | Knowles | |
| 6,343,320 | B1 * | 1/2002 | Fairchild et al. | 709/224 |
| 6,345,764 | B1 | 2/2002 | Knowles | |
| 6,467,081 | B2 * | 10/2002 | Vaidyanathan et al. | 717/123 |
| 6,477,589 | B1 * | 11/2002 | Suzuki et al. | 710/18 |
| 6,611,863 | B1 * | 8/2003 | Banginwar | 709/220 |
| 6,708,072 | B2 * | 3/2004 | Arima et al. | 700/108 |
| 6,708,166 | B1 * | 3/2004 | Dysart et al. | 707/6 |

(Continued)

FOREIGN PATENT DOCUMENTS

JP 10-149270 6/1998

(Continued)

OTHER PUBLICATIONS

Eric Ladd, Jim O'Donnell, et al., "Platinum Edition Using HTML 4, XML, and Java 1.2", Dec. 1998, Que, pp. 692-696.*

(Continued)

*Primary Examiner*—Patrice Winder
*Assistant Examiner*—Thomas Duong
(74) *Attorney, Agent, or Firm*—Oblon, Spivak, McClelland, Maier & Neustadt, P.C.

(57) ABSTRACT

A method of monitoring a device among distinct devices communicatively coupled to a network is described. The method includes the steps of accessing a device, receiving information from the accessed device, parsing the received information to extract parameter values representing an operational status of the device, retrieving operational status information corresponding to the extracted parameter values from a database. The database stores operational status information for said distinct devices. The operational status information is displayed, using the operational status information retrieved from the database, to a user in a user-comprehensible format.

12 Claims, 9 Drawing Sheets

U.S. PATENT DOCUMENTS

| | | | | |
|---|---|---|---|---|
| 6,728,787 | B1 * | 4/2004 | Leigh | 719/327 |
| 6,782,426 | B1 * | 8/2004 | Kuroshima et al. | 709/229 |
| 6,801,507 | B1 * | 10/2004 | Humpleman et al. | 370/257 |
| 6,813,248 | B1 * | 11/2004 | Boss et al. | 370/252 |
| 6,829,630 | B1 * | 12/2004 | Pajak et al. | 709/201 |
| 6,862,698 | B1 * | 3/2005 | Shyu | 714/57 |
| 6,907,609 | B1 * | 6/2005 | Kukura et al. | 719/316 |
| 6,920,492 | B2 * | 7/2005 | Richard | 709/220 |
| 6,938,239 | B2 * | 8/2005 | McDermott et al. | 717/100 |
| 6,970,923 | B1 * | 11/2005 | Mukaiyama et al. | 709/223 |
| 6,988,123 | B2 * | 1/2006 | LeClair et al. | 709/201 |
| 7,053,767 | B2 | 5/2006 | Petite et al. | |
| 7,117,239 | B1 * | 10/2006 | Hansen | 709/200 |
| 2002/0062373 | A1 * | 5/2002 | Skingle | 709/225 |
| 2002/0078191 | A1 * | 6/2002 | Lorenz | 709/223 |
| 2002/0078205 | A1 * | 6/2002 | Nolan | 709/225 |
| 2003/0028577 | A1 * | 2/2003 | Dorland et al. | 709/100 |
| 2003/0217124 | A1 * | 11/2003 | Parry | 709/220 |

FOREIGN PATENT DOCUMENTS

| | | |
|---|---|---|
| JP | 11-167540 | 6/1999 |
| JP | 2002-023827 | 1/2002 |
| JP | 2002-042273 | 2/2002 |
| WO | WO 02/10919 | 2/2002 |

OTHER PUBLICATIONS

Eric Ladd, Jim O'Donnell, et al., "Platinum Edition Using HTML 3.2, Java 1.1 and CGI", Nov. 1996, Que, p. 484.*
U.S. Appl. No. 09/975,935, filed Oct. 15, 2001, pending.
U.S. Appl. No. 10/162,402, filed Jun. 5, 2002, pending.
U.S. Appl. No. 10/225,290, filed Aug. 22, 2002, pending.
U.S. Appl. No. 10/167,402, filed Jun. 5, 2002, Motoyama.
U.S. Appl. No. 10/328,008, filed Dec. 26, 2002, Motoyama et al.
U.S. Appl. No. 10/328,026, filed Dec. 26, 2002, Motoyama et al.
U.S. Appl. No. 10/328,003, filed Dec. 26, 2002, Motoyama et al.
U.S. Appl. No. 10/162,402, filed Jun. 5, 2002, Motoyama.
U.S. Appl. No. 10/372,939, filed Feb. 26, 2003, Motoyama.
U.S. Appl. No. 10/460,408, filed Jun. 13, 2003, Motoyama et al.
U.S. Appl. No. 10/460,150, filed Jun. 13, 2003, Motoyama et al.
U.S. Appl. No. 10/460,404, filed Jun. 13, 2003, Motoyama et al.
U.S. Appl. No. 10/460,151, filed Jun. 13, 2003, Motoyama et al.
G. A. Halse, et al., South African Telecommunications Network and Application Conference, pp. 1-6, XP-002247410, "XML to Facilitate Management of Multi-Vendor Networks", Sep. 2, 2001.
U.S. Appl. No. 10/670,505, filed Sep. 26, 2003, Motoyama.
U.S. Appl. No. 10/670,604, filed Sep. 26, 2003, Motoyama.
U.S. Appl. No. 10/764,582, filed Jan. 27, 2004, Motoyama et al.
U.S. Appl. No. 10/764,467, filed Jan. 27, 2004, Motoyama et al.
U.S. Appl. No. 10/764,569, filed Jan. 27, 2004, Motoyama et al.
U.S. Appl. No. 10/764,527, filed Jan. 27, 2004, Motoyama et al.
U.S. Appl. No. 11/032,039, filed Jan. 11, 2005, Motoyama et al.
U.S. Appl. No. 11/032,192, filed Jan. 11, 2005, Motoyama et al.
U.S. Appl. No. 11/032,016, filed Jan. 11, 2005, Motoyama et al.
U.S. Appl. No. 11/032,063, filed Jan. 11, 2005, Motoyama et al.
U.S. Appl. No. 11/032,088, filed Jan. 11, 2005, Motoyama et al.
U.S. Appl. No. 09/756,120, filed Jan. 9, 2001, pending.
U.S. Appl. No. 09/953,358, filed Sep. 17, 2001, pending.
U.S. Appl. No. 10/068,861, filed Feb. 11, 2002, pending.
U.S. Appl. No. 10/142,989, filed May 13, 2002, pending.
U.S. Appl. No. 10/157,902, filed May 31, 2002, pending.
U.S. Appl. No. 60/359,648, filed Feb. 27, 2002, pending.
U.S. Appl. No. 10/157,904, filed May 31, 2002, pending.
U.S. Appl. No. 10/157,903, filed May 31, 2002, pending.
U.S. Appl. No. 10/157,905, filed May 31, 2002, pending.
U.S. Appl. No. 11/153,543 filed Jun. 16, 2005, Motoyama et al.
U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.
U.S. Appl. No. 11/234,323, filed Sep. 26, 2005, Motoyama et al.
U.S. Appl. No. 11/517,363, filed Sep. 8, 2006, Motoyama et al.
U.S. Appl. No. 11/517,430, filed Sep. 8, 2006, Motoyama et al.
U.S. Appl. No. 11/517,362, filed Sep. 8, 2006, Motoyama et al.
U.S. Appl. No. 11/517,378, filed Sep. 8, 2006, Motoyama et al.
U.S. Appl. No. 11/517,428, filed Sep. 8, 2006, Motoyama et al.
U.S. Appl. No. 10/162,402, Jun. 5, 2002, Motoyama.
U.S. Appl. No. 11/867,741, Oct. 5, 2007, Motoyama et al.
U.S. Appl. No. 11/940,785, filed Nov. 15, 2007, Motoyama et al.
U.S. Appl. No. 10/960,248, filed Dec. 19, 2007, Motoyama et al.
G. A. Halse, et al., South African Telecommunications Network and Application Conference, pp. 1-6, XP-002247410, "XML to Facilitate Management of Multi-Vendor Networks", Sep. 2, 2001.

* cited by examiner

| | | | | | | | |
|---|---|---|---|---|---|---|---|
| Home Configuration Status | | | | | | | |
| Toner Level | | | | | | | |
| Machine | B | Y | C | M | location | Contact | phone |
| PF1 (Xerox N4025) | OK | - | - | - | RM 201 | A. Fong | 5432 |
| PF2 (Xerox NC60) | Low | Low | Low | OK | Lab A1 | A. Fong | 5432 |
| PT1 (HP LJ9000) | OK | - | - | - | Hall 3 | T. Motoyama | 5445 |
| PT2 (HP C LJ4550) | OK | K | OK | OK | Hall 5 | T. Motoyama | 5445 |
| PT3 (Lexmark T616) | Out | - | - | - | Hall 7 | T. Motoyama | 5445 |

IP Address

| sIPAddress | sVendor | sModel | nVendorModelID |
|---|---|---|---|
| 172.30.4.51 | Vendor1 | NC60 | 100100 |
| 172.30.4.52 | Vendor1 | N4025 | 100200 |
| 172.30.4.53 | Vendor2 | Model 9000 | 200100 |

902

KeyValue

| nVendorModelWebID | sKeyString | sValuePosition | sValueType | sDelimiter | nInLinePosition | nStdEnum |
|---|---|---|---|---|---|---|
| 100101 | Serial Number | 1 | char | | | 102 |
| 100101 | Machine Model | 1 | char | | | 101 |
| 100103 | Black Toner | 1 | char | | | 700 |
| 100103 | Cyan Toner | 1 | char | | | 702 |
| 100201 | Serial Number | 1 | char | | | 102 |
| 100201 | Machine Model | 1 | char | | | 101 |
| 100203 | Toner | 1 | char | | | 700 |
| 200101 | Product Name | 0 | char | : | 1 | 101 |
| 200101 | Printer Serial Number | 0 | char | : | 1 | 102 |
| 200103 | Black | 2 | Num | % | | 101 |

910, 904, 912

VendorModelWebPage

| nVendorModelWebID | sWebPage |
|---|---|
| 100101 | /configurationPage.htm |
| 100103 | /consumablePage.htm |
| 100201 | /configurationPage.htm |
| 100203 | /consumablePage.htm |
| 200101 | /Vendor2/first |
| 200103 | /Vendor2/second |

906

KeyEnumTable

| nStdEnum | sEnumDescription |
|---|---|
| 101 | Model |
| 102 | UniqueID |
| 700 | Black |
| 701 | Magenta |
| 702 | Cyan |
| 703 | Yellow |

METHOD AND SYSTEM FOR MONITORING NETWORK CONNECTED DEVICES AND DISPLAYING DEVICE STATUS

CROSS-REFERENCE TO RELATED APPLICATIONS

This application is related to commonly owned co-pending U.S. Patent Application Ser. No. 60/359,648 filed Feb. 27, 2002 entitled "ARCHITECTURE OF THE REMOTE MONITORING OF DEVICES THROUGH THE LOCAL MONITORING STATION AND SENDING TO THE CENTRAL STATION IN WHICH THE MULTIPLE VENDORS ARE SUPPORTED" which is incorporated herein by reference in its entirety. This application is related to the following commonly owned co-pending applications: U.S. patent application Ser. No. 10/068,861, filed Feb. 11, 2002, entitled "Method and Apparatus Utilizing Communication Means Hierarchy to Configure or Monitor an Interface Device"; U.S. patent application Ser. No. 10/142,989, filed May 13, 2002, entitled "Verification Scheme for Email Message Containing Information About Remotely Monitored Devices"; U.S. patent application Ser. No. 09/756,120, filed Jan. 9, 2001, entitled "Method and System of Remote Support of Device Using Email"; U.S. patent application entitled "Method and Apparatus for Modifying Remote Devices monitored by a Monitoring System", filed May 31, 2002; U.S. patent application Ser. No. 09/975,935, filed Oct. 15, 2001, entitled "Method and System for Remote Support of Device Using Email Based Upon Pop3 With Decryption Capability Through Virtual Function"; U.S. patent application Ser. No. 09/953,358, filed Sep. 17, 2001, entitled "Method and System of Remote Support of Device Using Email Through Data Transfer Module" the disclosures of which are also incorporated herein by reference in their entirety.

BACKGROUND OF THE INVENTION

1. Field of the Invention

This invention relates to monitoring devices connected to a network. More particularly, it relates to a method and system for monitoring at least one network connected device and displaying device status in a user-comprehensible format.

2. Discussion of Related Art

As is generally known, computer systems include hardware and software. Software includes a list of instructions that are created to operate and manage hardware components that make up a computer system. Typically, computer systems include a variety of hardware components/devices that interface with one another. The computer system can be a stand-alone type or a networked type. In a networked typed computer system, a plurality of distinct devices are connected to a network and thus communication between these distinct devices is enabled via the network.

Also, software for operating the hardware devices needs to be configured in order to allow communication between the hardware devices so that the hardware devices are enabled to function cooperatively. Further, in order to facilitate such a communication, it is also desirable for hardware devices to be monitored and the status of each hardware device identified in order to ensure that each hardware device is functioning in an efficient manner.

For the purposes of this patent application, the inventor has determined that a hardware device that is configuring or monitoring the plurality of distinct devices or hardware devices would be referred to as a monitoring device and the hardware devices that are being monitored by the monitoring device would be referred to as "monitored devices".

For hardware devices that are located on a network, it is desirable for these devices to be monitored for maintenance, usage, or other purposes. However, in view of manufacturer differences relating to hardware devices and interfaces, it may be difficult for a monitoring device to communicate with various other devices connected to a network. Such a disadvantage most likely prevents network administrators from obtaining crucial information about the performance and efficiency of the devices connected to the network.

The Simple Network Management Protocol (SNMP) is today a de-facto industry standard for monitoring and management of devices on data communication networks, telecommunication systems and other globally reachable devices. Practically every organization dealing with computers and related devices expects to be able to centrally monitor, diagnose and configure each such device across local and wide area networks. SNMP is the protocol that enables this interaction.

In order for a device to respond to SNMP requests it must be equipped with the software that enables it to properly interpret an SNMP request, perform the actions required by that request and produce an SNMP reply. The SNMP agent software is typically a subsystem software module residing in a network-entity.

The collection of objects implemented by a system is generally referred to as a Management Information Base (MIB). An MIB may also be a database with information related to the monitoring of devices. Examples of other MIB's include Ethernet MIB, which focuses on Ethernet interfaces; Bridge MIB, which defines objects for the management of 802.1D bridges, to name a few.

Using SNMP for monitoring devices is difficult as private MIB's include values that are hard to decipher without a valid key. A company using SNMP for monitoring various devices, connected to its network, creates a unique identifier/key that is maintained as proprietary information of the company. For most part, the results are displayed as binary or integer values. Thus, using SNMP, results received from the devices that are being monitored ("monitored devices"), fail to provide a user the status of the monitored devices in a user comprehensible manner.

Further, using SNMP, it is difficult for one to obtain detailed information about a monitored device without a valid key or access to a private MIB to decipher the results obtained as binary or integer values.

BRIEF SUMMARY OF THE INVENTION

The system and method of the present invention addresses a solution to the above-identified problems by enabling monitoring of devices that are connected to a network. Data received from the monitored devices is parsed using an HTML/XML parser to extract desirable parameters. The extracted parameters are correlated with information stored in a database, and the data stored in association with the extracted parameters is displayed in a user-comprehensible manner.

In the present invention, a monitoring system enables monitoring at least one device (monitored device) connected to a network, such as for example, a LAN or a WAN. The monitored device is configured to have a unique IP address. The IP address allocated to the monitored device, and the details of the manufacturer for the monitored device are stored in a database.

Once a page location of the monitored device is accessed (i.e., by accessing the IP address), a specific web page corresponding to the monitored device is displayed. Information displayed on the web page is in the form of key and value pairs. An HTML/XML parser is used to parse the displayed page in order to retrieve user requested information from the information displayed on the web page. The user requested information and parameter values extracted from the web page using the HTML/XML parser are stored in the database. The extracted parameter values are then correlated with predetermined information stored in the database for the monitored device. Detailed information obtained from the correlation step is displayed to a user in a format that is user-comprehensible.

In one aspect, the present invention provides a method of monitoring a device among distinct devices communicatively coupled to a network, the method comprising the steps of accessing the device; receiving information from the accessed device; parsing the received information to extract parameter values representing an operational status of the device; storing a key string associated with one of said parameter values and a position used by the parsing step; and retrieving operational status information corresponding to the extracted parameter values from a database, the database storing operational status information for the distinct devices.

The method further includes the steps of checking each of the distinct devices with a unique IP address; and storing the IP addresses assigned to the distinct devices. The name of a manufacturer name and model in association with at least one of said IP addresses are stored. The extracted parameter value preferably corresponds to a distinct operational status for distinct devices. Monitoring of the distinct devices is performed using HTTP protocol. The receiving step includes receiving information from the accessed device in HTML/XML format. The step of accessing a device includes periodically polling the plurality of devices or by forwarding an affirmative request to the device.

In another aspect, the present invention provides an apparatus for monitoring a device among distinct devices communicatively coupled to a network, comprising a processor for accessing the device to receive device data; an HTML/XML parser for parsing the received device data to extract parameter values, said parameter values representing an operational status of the device; a storage device for storing distinct operational status information for distinct devices; and a parameter extractor for extracting operational status information stored in the storage device in association with the extracted parameter values. The apparatus further includes a display device for displaying the operational status information, using the operational status information extracted from the storage device, to a user in a user-comprehensible format.

In another aspect, the present invention provides in a network-based system having a plurality of devices and a monitoring system communicatively coupled to a network, a method of monitoring the plurality of devices comprising accessing a device among the plurality of devices using HTTP protocol; receiving information from the device in an HTML or XML format; parsing the received information to extract parameter values identified as key and value pairs; storing the key and value pairs in a storage device; extracting manufacturer-related information stored in association with the key and value pairs; and displaying the extracted manufacturer-related information in a user-comprehensible format, wherein an extracted parameter value corresponds to a distinct manufacturer-related information for distinct devices.

In a further aspect, the present invention provides a computer program product within a computer usable medium, comprising: instructions for accessing a device among distinct devices; instructions for receiving information from the accessed device; instructions for parsing the received information to extract parameter values representing an operational status of the device; instructions for retrieving operational status information corresponding to the extracted parameter values from a database, the database storing operational status information for said distinct devices; and instructions for displaying the operational status information using the operational status information retrieved from the database to a user in a user-comprehensible format.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 9B illustrates exemplary data organized in various tables for different devices.

DETAILED DESCRIPTION OF THE PREFERRED EMBODIMENTS

Figure 1:
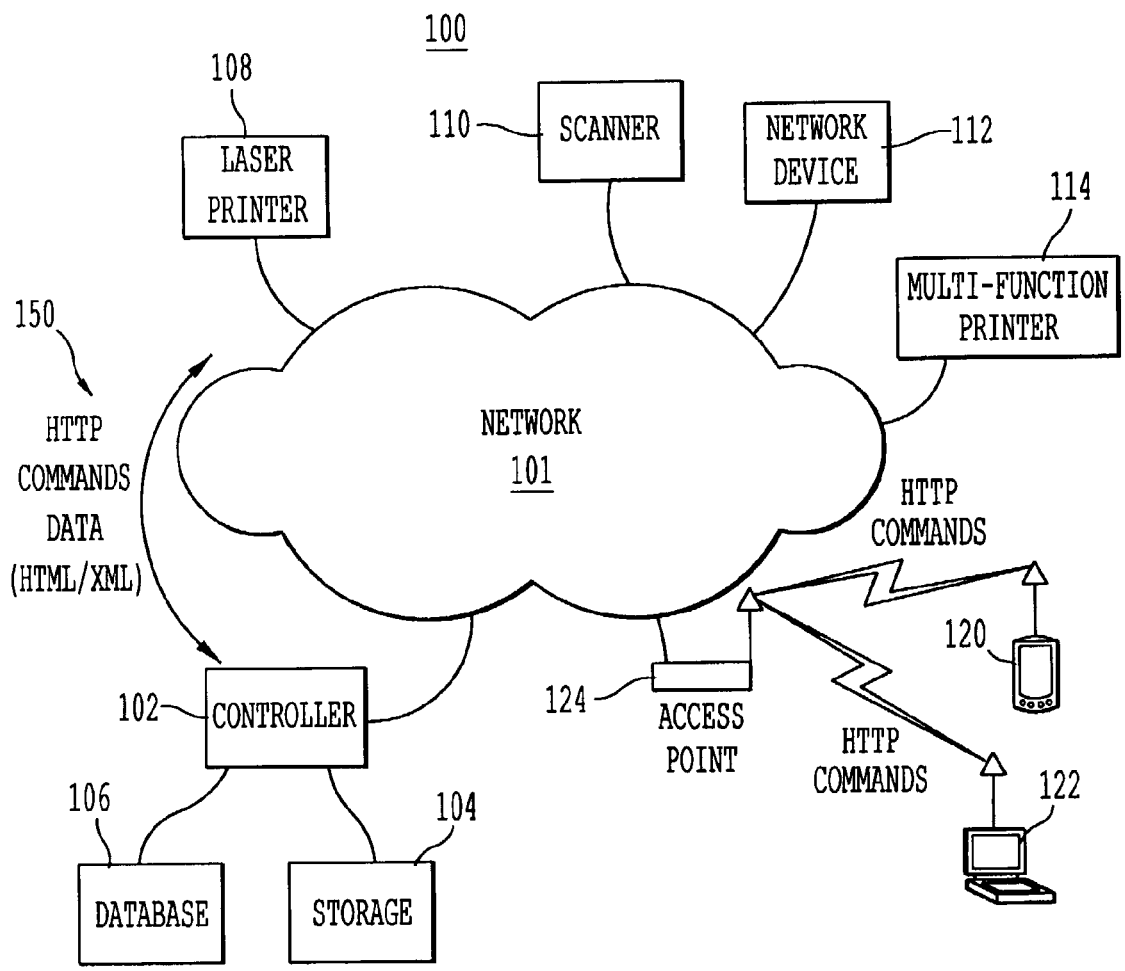
FIG. 1 is a schematic representation of the overall system in accordance with an exemplary embodiment of the present invention.
Figure 3:
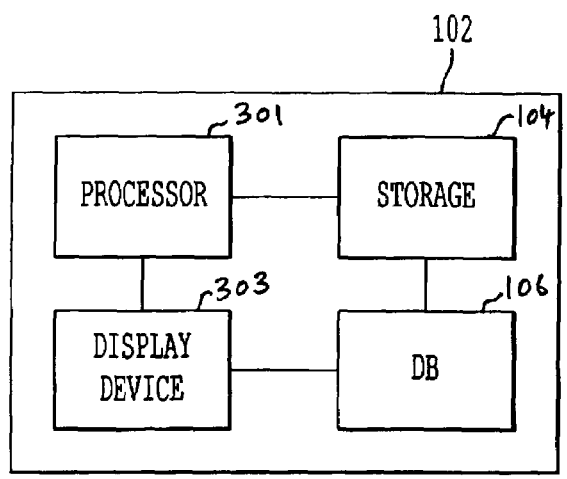
FIG. 3 is an exemplary schematic of the controller shown in FIG. 1.

Referring now to FIG. 1, there is shown a schematic representation of the overall system 100 in accordance with an exemplary embodiment of the present invention. System 100 is shown to include a plurality of devices, for example, a laser printer 108, a scanner 110, a network device 112, and a multi-function printer 114, all connected to a network 101. These plurality of devices are generally referred to herein as "monitored devices". The system 100 also includes a workstation/monitoring system 102 (hereinafter referred to as "controller 102"), the details of which are illustrated in FIG. 3, connected to the network 101 for monitoring and controlling the monitored devices 108, 110, 112, and 114. Each of the monitored devices 108, 110, 112, and 114 are given a unique address locator. For example, an IP address assigned to a device serves as a unique address locator for the device.

Thus, a user at controller 102 is able to access a respective device among the monitored devices 108-114 by accessing the unique IP address assigned to the respective monitored device. It will be appreciated that the present invention is not limited to using IP addresses to uniquely identify devices connected to a network.

Figure 2:
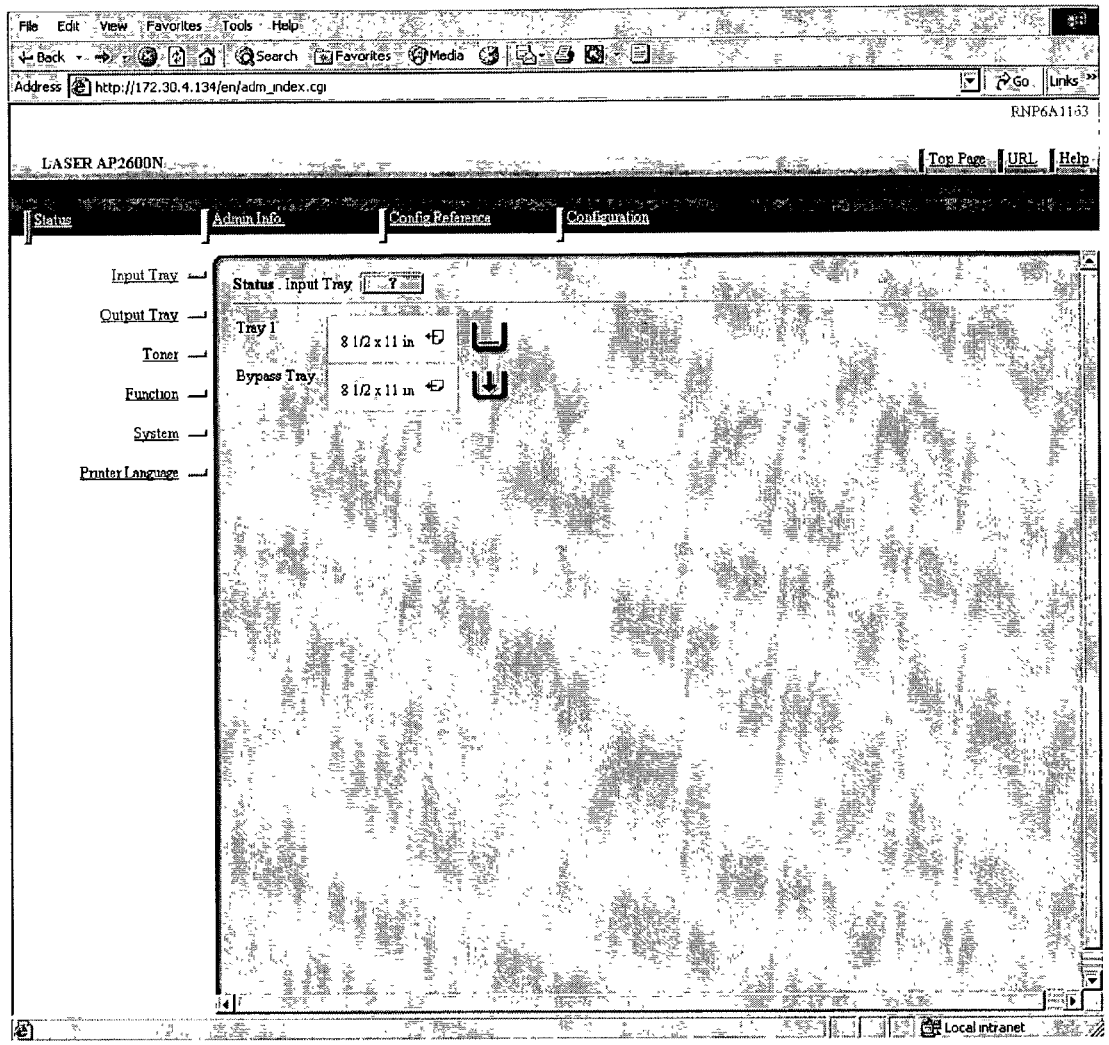
FIG. 2 is an exemplary web page interface corresponding to a unique IP address of a monitored device as shown in FIG. 1.

The controller 102, upon accessing a device among the monitored devices 108-114, displays a web page assigned to the device. The web page includes detailed information about the operational status of the device including troubleshooting information. For example, controller 102 accesses and displays the web page assigned to the laser printer 108. An exemplary web page interface is shown in FIG. 2. The web page includes the operational status/details of the laser printer 108 including such details as toner level, indication of paper jam, quantity of print paper in printer trays, etc. Likewise, operational history of the laser printer may also be displayed on the web page. Preferably, unique operational details of the laser printer 108 may be displayed in unique fields on its web page. Likewise, operational status/details of each of the monitored devices 108-114 are displayed on their respective web pages.

It will be appreciated that the controller 102 may be either physically connected or wirelessly coupled to the network 101. For example, a personal digital assistant (PDA) 120 or a laptop computer 122, shown to be wirelessly coupled to the network 101, may also be used as a controller 102. An access point 124 acts as an interface to enable wireless communications between the network 101 and PDA 102 or laptop computer 122. Henceforth, the present invention will be described with the assumption that the controller 102 will be controlling and monitoring the status of the monitored devices connected to the network.

The network 101 facilitates communication between the controller 102 and the monitored devices 108-114 to enable monitoring and control of such monitored devices. The number of devices that are connected to the network is not limiting of the present invention. It will be appreciated that the network 101 may be a local area network (LAN) or a wide area network (WAN). Likewise, the monitored devices 108, 110, 112, and 114 are shown to be merely exemplary. Also, the monitored devices may be, for example, vending machines, various meters (for example, gas, electric and water), or appliances (such as a TV, a refrigerator, a stove, a water heater, a heater, air-conditioner, a microwave oven, a dishwasher, a stereo or a DVD).

The controller 102 is communicatively coupled to a storage device 104 and a database 106. The storage device 104 includes a hard disk, optical disk, and/or an external disk drive. The database 106 is communicatively linked to the storage device 104, and includes a Relational Database Management System (RDBMS) for easy search and retrieval of data stored in the storage device 104. The storage device 104 preferably stores detailed information about each of the monitored devices 108-114. For example, detailed information, such as the make, model, and various functions and trouble-shooting details of the laser printer 108 are stored in the storage device 104. Also, deviation values about the operational status of the laser printer compared to predetermined reference values may also be stored in the storage device 104. Although the database 106 and the storage device 104 are described to be communicatively coupled to the controller 102, it will be appreciated that the controller 102 may be built with the storage device and the database installed therein. In such a case, the storage device 106 and the database 104 would be depicted as being internal to the controller 102.

The controller 102 is installed with software, the details of which are illustrated in FIG. 2, in order to facilitate monitoring and control of the plurality of devices 108-114. Hyper Text Transfer Protocol (HTTP) is used by the controller 102 for monitoring the plurality of devices 108-114 and the data received from the plurality of devices 108-114 is presented in the form of HTML or XML formats, or any other web browser languages.

Referring now to FIG. 3, there is shown an exemplary schematic illustrating the details of the controller 102. The controller 102 includes a storage device 104, a database 106, and processor 301, and a display device 303. The processor 301 is loaded with software instructions to perform all the software functions of components identified in FIG. 4. As described with reference to FIG. 1, the controller 102 is shown to include the storage device 104 and the database 106. However, the present invention is not restrictive of this embodiment. The storage device 104 and the database 106 may very well be disposed outside of the controller. Likewise, display device may be integrated with the controller 102 or be provided as a separate device with controller output being supplied as input to the display device.

Figure 4:
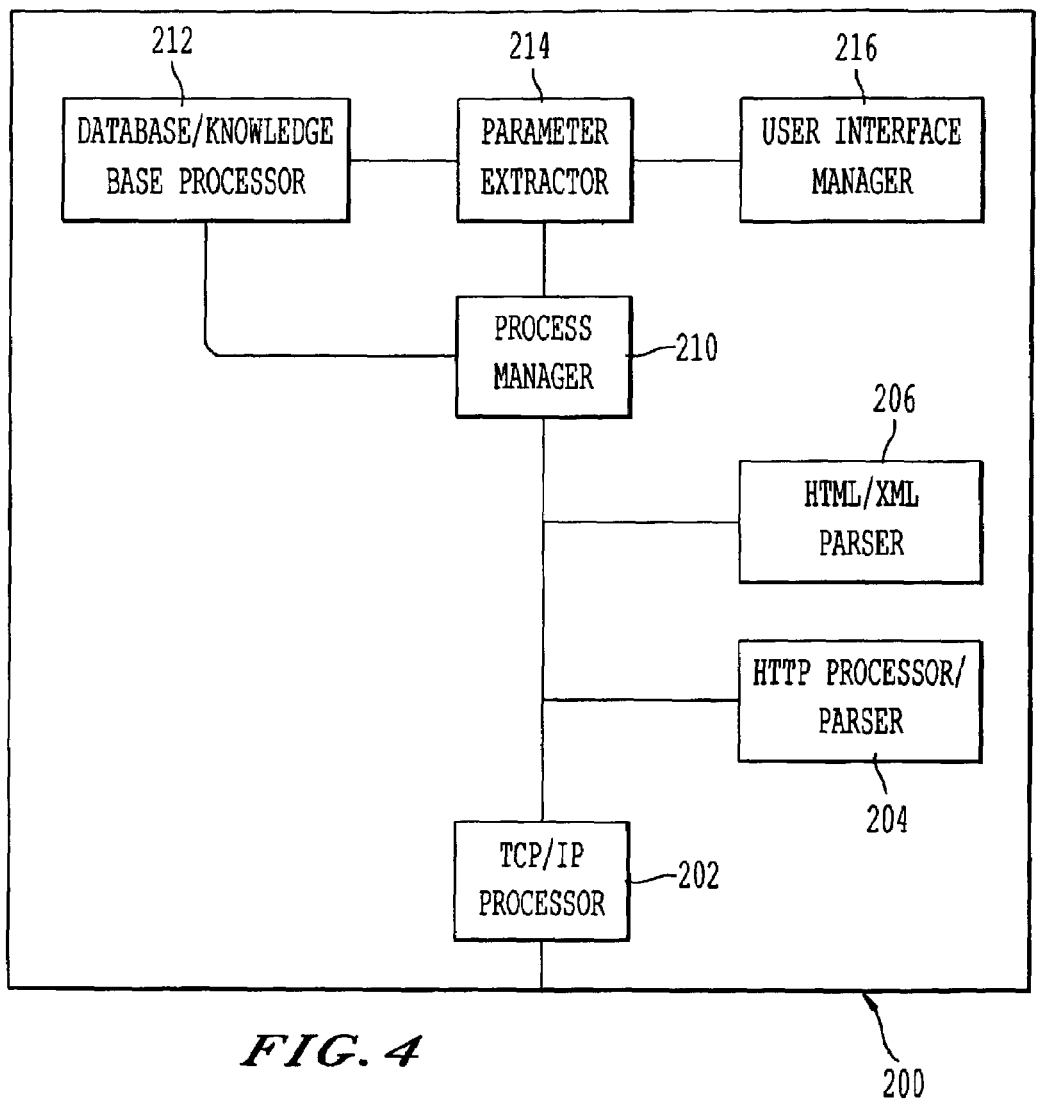
FIG. 4 illustrates a schematic of software components of the monitoring system as shown in FIG. 1.

FIG. 4 illustrates a schematic of software components of the monitoring system as shown in FIG. 1. The software 200 is loaded in the controller 102 to enable the controller 102 to perform monitoring and control of the monitored devices 108-114. The software 200 is shown to include various software components such as a TCP/IP Processor 202, HTTP Processor/Parser 204, HTML/XML Parser 206, a Process Manager 210, a Database/Knowledgebase Processor 212, a Parameter Extractor 214, and a User Interface Manager 216. Each of the software components may be subroutines written using any of the known computer languages such as for example, Java®, Visual Basic, C, C++, Visual C++, PERL, to name a few. It will be appreciated that the present invention is not limiting of the language used for writing the subroutines, and that other languages may be used.

TCP/IP Processor 202 enables communication between network related layers located hierarchically below the application layer. For example, the TCP/IP processor establishes communications with each of the plurality of devices 108-114 by obtaining respective IP addresses from the database 106. HTTP Processor/Parser 204 controls and manages the HTTP related commands until target data from the plurality of devices is acquired. For example, commands, to a respective device among the monitored devices 108-114, are given using HTTP protocol. The commands include the IP address of the respective monitored device, and are preferably launched on server port 80 (i.e., the same port that Web traffic flows on).

For example, HTTP Processor/Parser 204 issues "GET/ HTTP/1.1" and related parameters such as "Accept-Language: en-us" and "Connection: Keep-Alive". If the reply from the target device is "HTTP/1.1 301 Moved Permanently" with "Location:

http://172.30.4.57:80/xx/device/this.LCDispatcher", then the HTTP Processor/Parser 204 automatically changes the access location and stores the updated information in the database 106 (FIG. 1), and these steps are controlled through Process Manager 210.

Information received from a monitored device, from among the plurality of devices 108-114, is in the form of key and value pairs displayed in an HTML format. The key and value pairs differ from one manufacturer to the other. For example, the number of pages printed by Lexmark devices is in the same line as the key word "Page Count". However, for HP printers, it is not the case. Thus, it is desirable to extract necessary information from the web page of a specific monitored device and correlate the extracted value to particular parameter of interest to store in the database or to display results, about the operational status of the specific monitored device(s), to a user in a user-comprehensible format.

The HTML/XML parser 206 parses data received from the monitored devices in order to extract the key and value pairs, the functions of the HTML/XML parser being similar to the usual browser except that the information is not displayed in a format that is user comprehensible. An exemplary Java Script that is ignored by the HTML/XML parser 206 is set forth in the Appendix.

One function of the HTML/XML parser 206 is to parse the information received in an HTML format from a device among the plurality of monitored devices 108-114 (FIG. 1) and collects necessary information related to the operational status/functioning of the device. The collected information is forwarded to the process manager 210 which interacts with a knowledge-base processor 212 and a parameter extractor 214 to extract the necessary information from the collected information. The extracted information is stored in the storage device 104 and organized for easy search and retrieval in the database 106 (FIG. 1).

The knowledge-base processor 212 interacts with the physical storage device 104 (FIG. 1) and the database 106 (FIG. 1) in order to correlate the extracted information with information stored in the storage device 104. As explained in detail with respect to FIG. 1, information stored in the storage device 104 includes information specific to the manufacturer of a respective device. The user interface manager 216 interacts with an end user and provides the user requested information regarding one or more of the monitored devices 108-114 (FIG. 1), which information is displayed to the end user in a user-comprehensible format.

Figure 5:
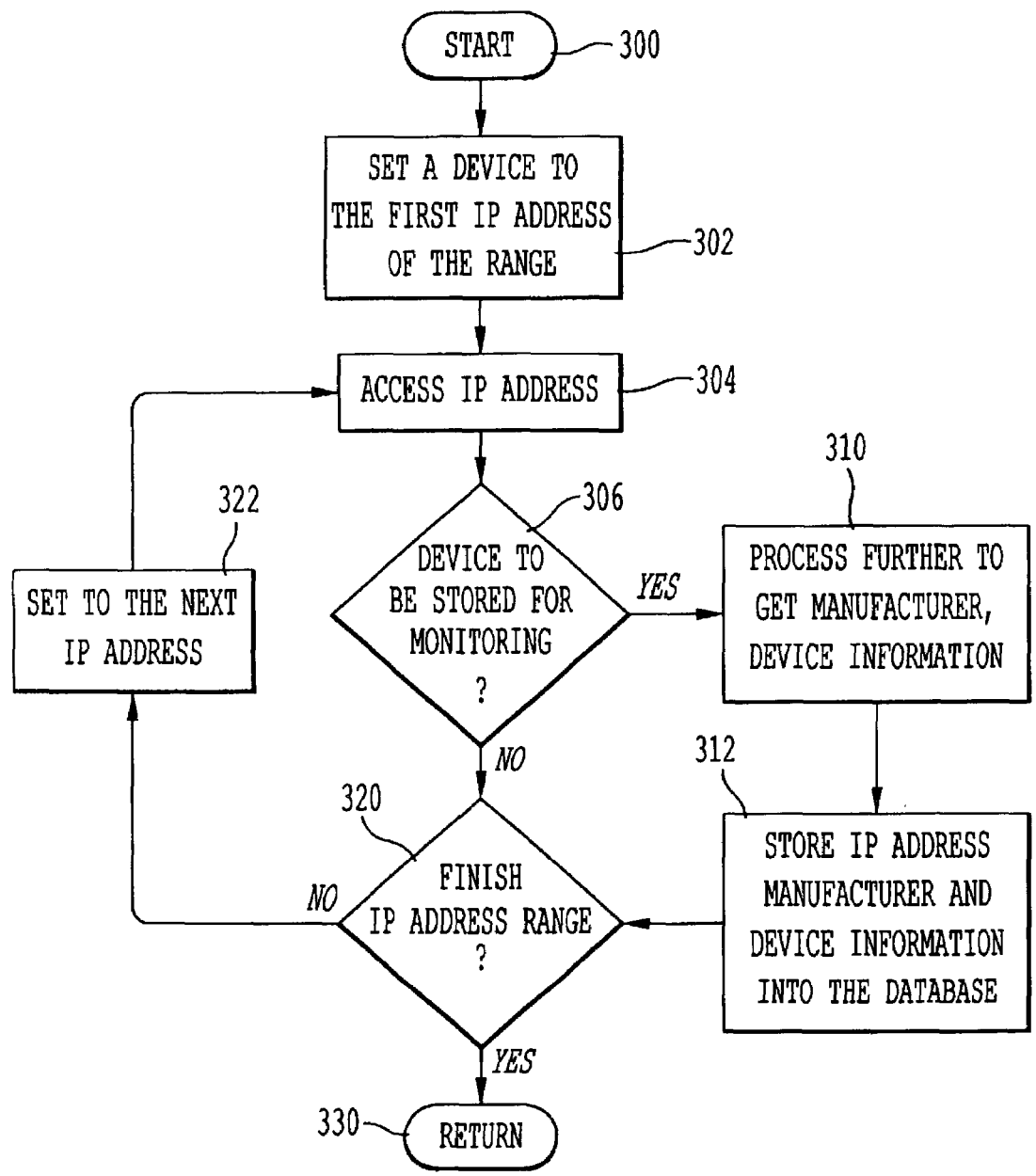
FIG. 5 is an exemplary flowchart illustrating the process steps involved in configuring devices that are being monitored within a range of predetermined IP addresses.

FIG. 5 is an exemplary flowchart illustrating the process steps involved in configuring/setting up monitored devices 108-114 (FIG. 1) with unique IP addresses within a range of predetermined IP addresses. Step 302 involves setting up a monitored device by checking the monitored device at a unique IP address from a known range or list of IP addresses. In step 304, the device accessed at the IP address is port 80 (known HTTP port). Step 306 stores devices for monitoring in a storage device if the device responds to the requests from the system and the system recognizes the device to be the system supported device. Once a monitored device, for example, the laser printer 108, is recognized at IP address, further information about the laser printer 108, as obtained from the manufacturer, is stored in the storage device 104 and correlated to the IP address assigned to the laser printer 108 as shown at steps 310 and 312. If a response to port 80 is not obtained or if the monitoring system fails to recognize the device, the process continues to step 320. The steps 304 through 320 is repeated until the range is covered or the list is exhausted and the process returns at step 330.

Figure 6:
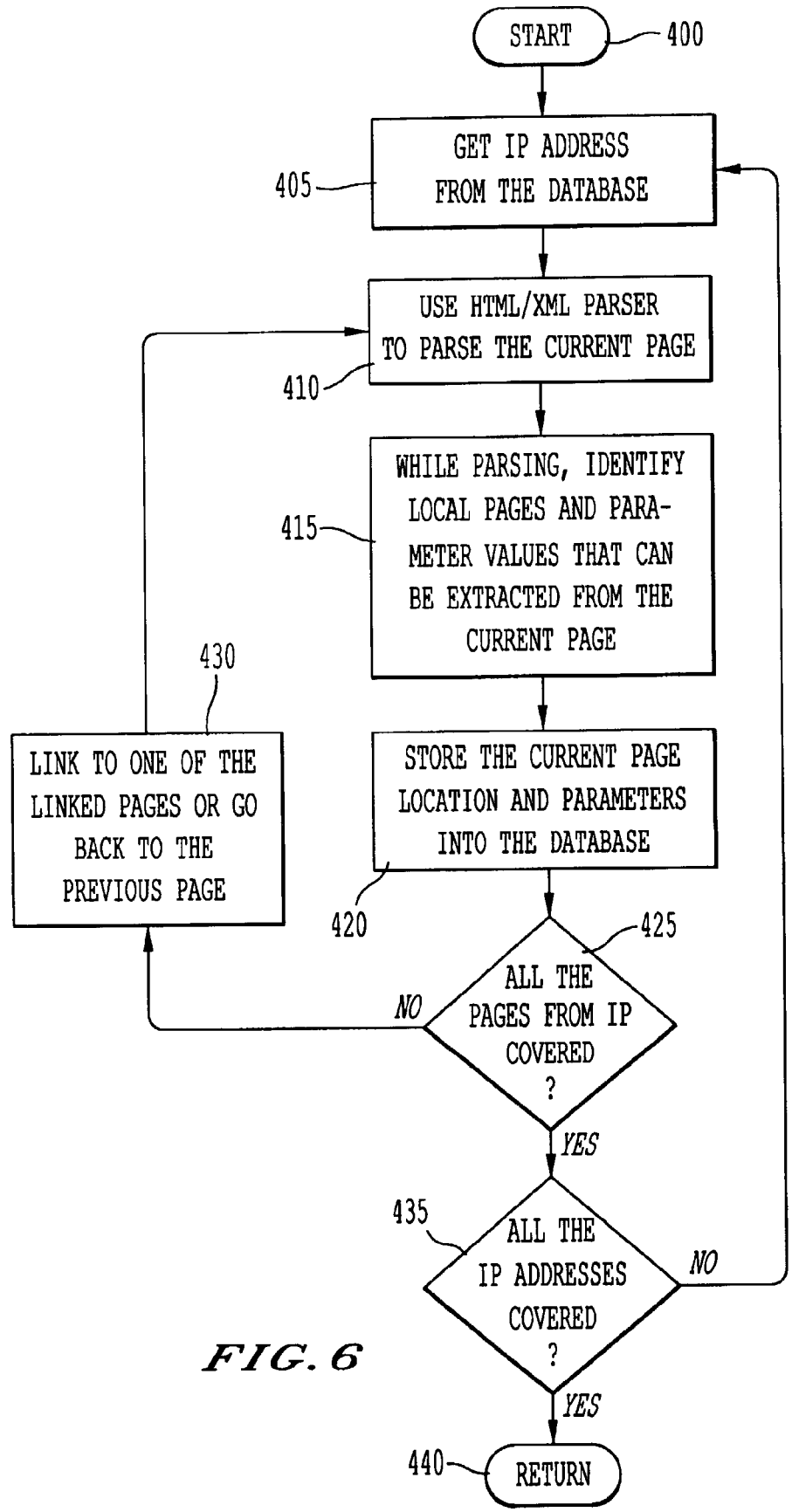
FIG. 6 is an exemplary flowchart illustrating the steps involved in obtaining information and various parameters from a web page displayed at a specific IP address.

FIG. 6 is an exemplary flowchart illustrating the steps involved in obtaining information and various parameters from a web page obtained from a specific IP address. After starting, IP address of a monitored device is obtained from the database in order to establish communication with such device. Once the monitored device is accessed and its web page retrieved, step 410 uses an HTML/XML parser to parse the information received in an HTML format from the monitored device. Step 415 identifies local pages and collects parameter values that can be extracted from the displayed web page of the monitored device. Step 420 stores the location of web page and the extracted parameters of the monitored device along with the details of extracting the values associated with parameters of interest into the database for easy search and retrieval.

Step 425 determines if all the pages from a particular IP address are covered and the necessary information extracted. If there are any pages remaining, from which necessary information needs to be extracted, then the process of extracting information is repeated as indicated at step 430. If all the pages from a particular IP address are covered, then the process moves to step 435. The above process steps are repeated until all the IP addresses are covered and the necessary information about monitored devices is extracted from each of the IP addresses. The process ends if all the IP addresses are covered.

Figure 7:
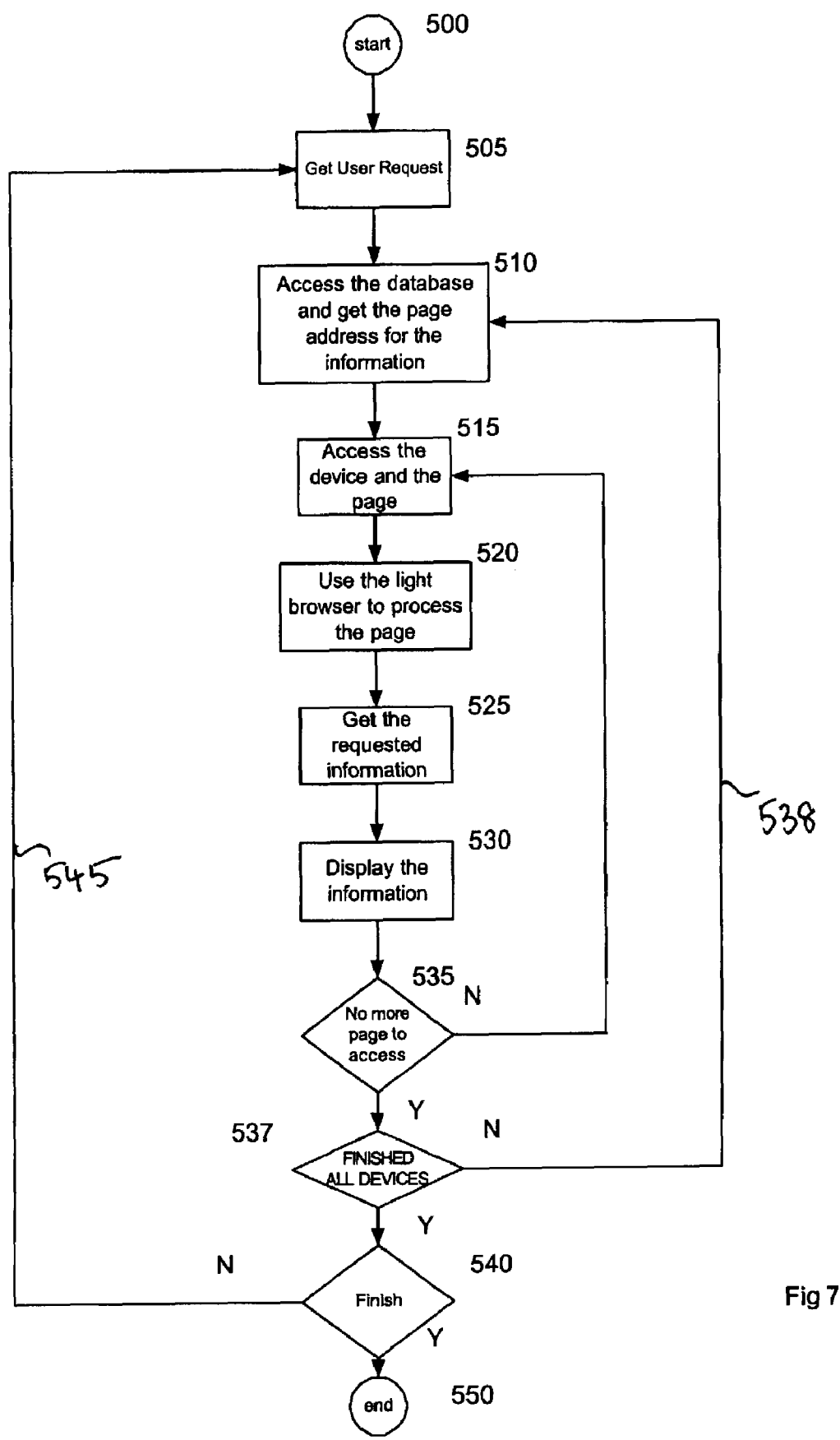
FIG. 7 is an exemplary flowchart illustrating the steps involved in retrieving and displaying user requested information from a web page.

FIG. 7 is an exemplary flowchart illustrating the steps involved in retrieving and displaying user requested information from a web page. Step 505 receives a request from a user regarding status/functional details of a monitored device. Once the request is received, step 510 accesses the database to retrieve the IP address/page address of the monitored device. The monitored device and its web page are accessed in step 515. Once the monitored device is accessed and its web page displayed as indicated at step 515, the HTML/XML parser parses the web page in order to obtain and display the information requested by the user as indicated at steps 520, 525, and 530.

The above process is repeated as shown at step 535 if there are further web pages that remain to be accessed in order to retrieve information requested by the user. At the step 537, a determination is made to identify if all the devices to be monitored are covered. If all the devices that need to be monitored are not covered, the process is repeated via loop 538 for a new device by reverting to step 510. However, if no further devices remain to be accessed, a determination is made to identify if there are other user requests, at step 540. In the event that there are further pending user requests, the process is repeated as indicated by loop 545.

Figures 8A, 8B:
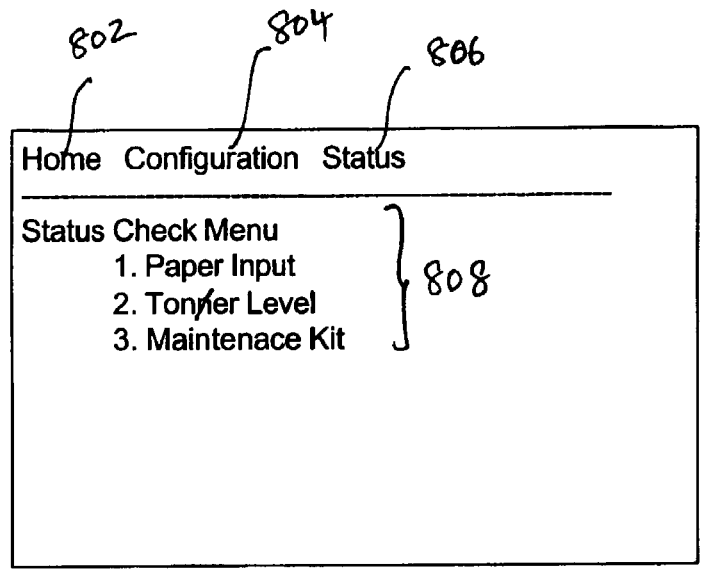
FIG. 8A illustrates an exemplary display to a user for the device monitoring menu.
FIG. 8B illustrates an exemplary table showing the toner status of monitored devices.

FIG. 8A illustrates an exemplary user interface to enable a user to monitor the status of a device. Field 802 denotes a home page, Field 804 denotes configuration information page, and field 806 denotes the status check page which is displayed in detail at 808. Although other display interfaces may be used, this display style, for example, assumes the interface to the user through a web browser.

FIG. 8B illustrates a response of the monitoring system when the user chooses "2" (Toner Level) from the Menu illustrated in FIG. 8A. Because there are two types of printers—black and white, or color—the toner status requires four types of toners as illustrated in FIG. 8B.

Figure 9A:
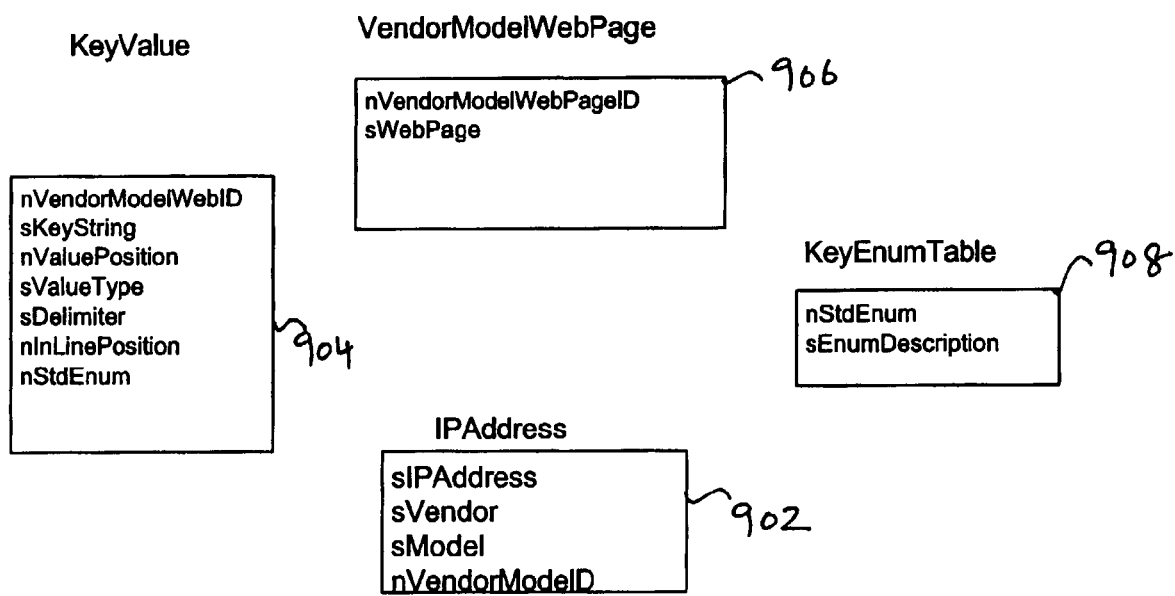
FIG. 9A illustrates an exemplary database table structure.

FIG. 9A shows four tables in the database along with respective database fields. IPAddress table 902 stores information about a monitored device's IP address, vendor, model and ID for the vendor model combination. KeyValue table 904 includes such information as, for example, the web page ID, key string information used to extract the parameter value of interest, value position in the HTML structure, value type, delimiters if the value is located in the same data as the key string, in-line-position of the value when the value is located in the same data as the key string, and the standard enumerator for the key string. VendorModelWebPage table 906 associates the web page ID to actual web page string. KeyEnumTable 908 includes the standard enumerations and their description.

FIG. 9B shows exemplary data stored within the four tables illustrated in FIG. 9A. In this example, the first four digits of the web ID is taken from the first four digits of the vendor model ID. In the KeyValue table 904, Model (101) identified at 910 and 912 has two different key strings, "Machine Model" and "Product Name". In addition, they are located at the different value positions. Machine Model is obtained from the next tag values in the HTML while Product Name is obtained from the same line. Product Name is separated from the actual model name with a delimiter':'.

The present invention enables monitoring of the various devices in a multi-vendor environment and further facilitates retrieving and displaying detailed information in a user-comprehensible manner even without having specific private management information base (MIB) information. In addition, the stored monitored information can be sent out through FTP or e-mail as described in co-pending applications that are incorporated herein by reference.

Although the present invention is shown to include a few devices, that require monitoring, connected to network, it will be appreciated that more than a few devices may be connected to the network without deviating from the spirit and scope of the invention. Also, the present invention may also be applied in a home environment where various devices need to be monitored and controlled.

The present invention enables the monitoring of the various devices in a multi-vendor environment and further facilitates retrieving and displaying detailed information in a user-comprehensible manner even without having specific private management information base (MIB) information.

The controller of the present invention may be conveniently implemented using a conventional general purpose digital computer or a microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMS, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. A method of monitoring, by a monitoring system, a monitored device among distinct devices communicatively coupled to a network, the method comprising:
   determining a plurality of identifiers, each identifier identifying a different device based on a manufacturer name and a model name;
   storing, in a digital repository accessible by the monitoring system, in association with each of the plurality of identifiers, (1) a keystring, and (2) an offset position relative to the keystring associated with a desired parameter representing a state of the corresponding device, wherein the keystring and the offset position vary and are modifiable based on at least one of the manufacturer name and the model name of the corresponding device;
   accessing, by the monitoring system, the monitored device using HTTP;
   receiving, by the monitoring system, information of the state of the monitored device directly from the accessed device in a browser language format, the information of the state of the monitored device including tag-based strings obtained from the monitored device;
   accessing the digital repository to obtain the keystring and the offset position corresponding to the desired parameter for the monitored device;
   parsing, by the monitoring system, the received tag-based strings to extract the desired parameter using the stored keystring and offset position associated with the desired parameter, wherein the parsing includes searching for the stored keystring within the tag-based strings; and
   storing, by the monitoring system, the extracted parameter in the digital repository accessible by the monitoring system.

2. The method as in claim 1, further comprising:
   checking each of the devices with a unique IP address; and
   storing the IP addresses assigned to each of the devices.

3. The method as in claim 2, further comprising the step of:
   storing the manufacturer name and the model name in association with at least one of said IP addresses.

4. The method as in claim 1, wherein the extracted parameter corresponds to a distinct operational status of the accessed device.

5. The method as in claim 1, wherein the step of accessing the device includes periodically polling the monitored device or forwarding an affirmative request to the monitored device.

6. The method of claim 1, wherein the monitored device is one of a printer, a scanner, a multifunction printer, a vending machine, a meter, and an appliance.

7. The method of claim 1, wherein the desired parameter representing the state of the monitored device is one of the model, unique identifier, serial number, toner level, and product name of the monitored device.

8. The method of claim 1, further comprising:
   accessing the digital repository to obtain a name of a web page on the monitored device in which the information of the state of the monitored device is stored, wherein the name of the web page is stored in the digital repository in association with at least one of the manufacturer name and the model name of the monitored device.

9. The method of claim 1, wherein the storing step comprises storing at least one of a delimiter and an in-line position when the value of the desired parameter is located in a same line as the keystring.

10. An apparatus for monitoring a monitored device among distinct devices communicatively coupled to a network, comprising:
   means for determining a plurality of identifiers, each identifier identifying a different device based on a manufacturer name and a model name;
   means for storing, in a digital repository accessible by the apparatus, in association with each of the plurality of identifiers, (1) a keystring, and (2) a offset position relative to the keystring associated with a desired parameter representing a state of the corresponding device wherein the keystring and the offset position vary and are modifiable based on at least one of the manufacturer name and the model name of the corresponding device;
   means for accessing the monitored device using HTTP;
   means for receiving information of the state of the monitored device directly from the accessed device in a browser language format, the information of the state of the monitored device including tag-based strings obtained from the monitored device;

means for accessing the digital repository to obtain the keystring and the offset position corresponding to the desired parameter for the monitored device;

means for parsing the received tag-based strings to extract the desired parameter using the stored keystring and offset position associated with the desired parameter, wherein the parsing includes searching for the stored keystring within the tag-based strings; and means for storing the extracted parameter in the digital repository accessible by the apparatus.

11. The apparatus as in claim 10, wherein the extracted parameter corresponds to a distinct operational status of the distinct device.

12. A computer program product encoded on a computer usable medium, comprising:

instructions for determining a plurality of identifiers, each identifier identifying a different device based on a manufacturer name and a model name;

instructions for storing, in a digital repository accessible by a monitoring system, in association with each of the plurality of identifiers, (1) a keystring, and (2) an offset position relative to the keystring associated with a desired parameter representing a state of a corresponding device, wherein the keystring and the offset position vary and are modifiable based on at least one of the manufacturer name and the model name of the corresponding device;

instructions for accessing, by the monitoring system using HTTP, the monitored device;

instructions for receiving, by the monitoring system, information of the state of the monitored device directly from the accessed device in a browser language format, the information of the state of the monitored device including tag-based strings obtained from the monitored device;

instructions for accessing the digital repository to obtain the keystring and the offset position corresponding to the desired parameter for the monitored device;

instructions for parsing, by the monitoring system, the received tag-based strings to extract the desired parameter using the stored keystring and offset position associated with the desired parameter, wherein the parsing includes searching for the stored keystring within the tag-based strings;

instructions for storing, by the monitoring system, the extracted parameter in the digital repository accessible by the monitoring system; and instructions for displaying the extracted parameter in a user-comprehensible format.

* * * * *